Feb. 26, 1946.  J. R. NEWCOMER, JR., ET AL  2,395,751

TOOL HOLDER

Filed Sept. 30, 1943

INVENTOR.
JACOB R. NEWCOMER JR.
CARROLL E. ADREON
BY George Douglas Jones
ATTORNEY

UNITED STATES PATENT OFFICE 2,395,751

TOOLHOLDER

Jacob R. Newcomer, Jr., Middle River, and Carroll E. Adreon, Baltimore, Md., assignors to The Glenn L. Martin Company, Middle River, Md., a corporation of Maryland Application September 30, 1943, Serial No. 504,398

2 Claims. (Cl. 77—58)

This invention relates to an improved form of cutting tool holder.

In spot facing or counterboring a drilled hole, it is usual to employ a shaft which forms a mount for the cutting tool and the end of the shaft forms a pilot pin. It is not uncommon that as the pilot pin rotates with the cutting tool in the drilled hole that the wall of the hole adjacent the pilot pin may become scored by particles getting between the pilot pin and the wall of the hole, and if the pilot pin is held to a close tolerance, the friction of such a pin is considerable.

By this invention is provided a pilot pin which may be held to close tolerance with the hole and yet accurately center the cutting tool on the hole. The pilot pin of this invention is of a simple and rugged construction and is adapted to take a large side thrust load.

The construction of the pilot pin herein disclosed is such that it may readily be taken apart for cleaning or repair.

Further and other objects will become apparent from the description of the accompanying drawing which forms a part of this disclosure and in which like numerals refer to like parts.

Figure 1:
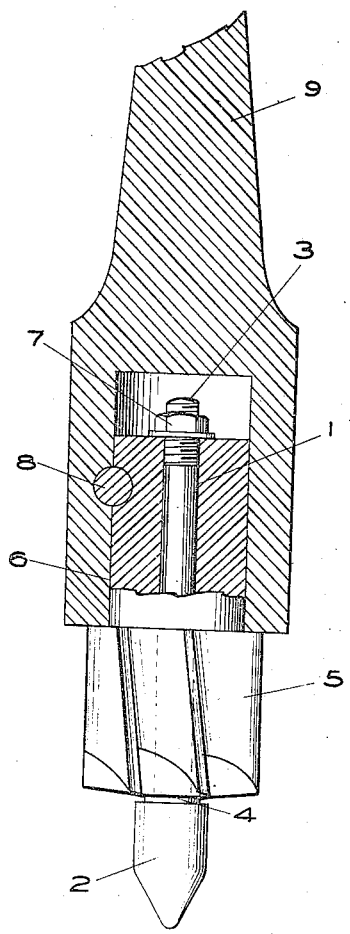
Figure 1 shows a typical use of the pilot pin with a cutting tool.

A tool holder having the improved pilot pin is shown in a typical use in Figure 1. The tool holder shaft 1 has a rotatable pilot pin 2 on one end. The other end may be threaded as shown at 3. The collar 4 is rigidly secured to shaft 1. Cutting tool 5 having sleeve portion 6 secured thereto, is mounted on the shaft and is seated on collar 4, and the assembly of the tool holder, cutter and sleeve are held together by nut 7. Pin 8 forms a locking device which secures the assembly in tool holder 9 that may be adapted to fit into the chuck of a drill press.

Figure 2:
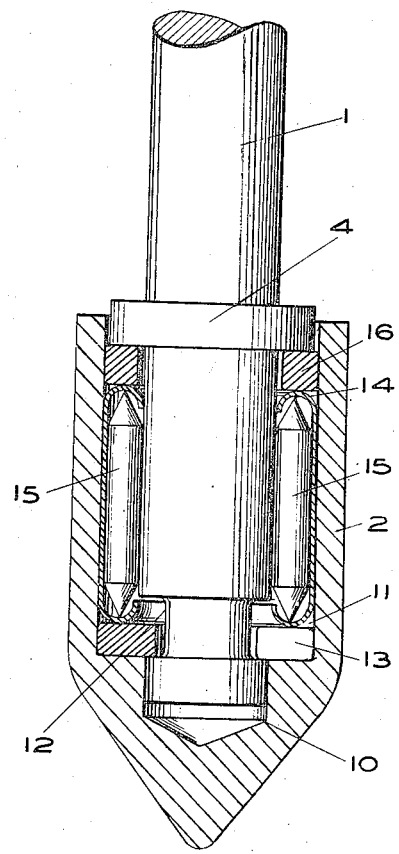
Figure 2 is a section through the pilot pin.

The salient features of this invention are shown in Figure 2. Pilot 2 is adapted to receive and retain the end of shaft 1. The pilot may be formed by drilling a hole 10 and counterboring this hole to form a space 11. The end of the shaft is formed with a groove 12 adjacent the bottom of the counterbored hole. Ring 13 is formed with a single cut as shown in Figure 2, and is of such diameter that it fits into groove 12 and presses against the inner wall of the pilot pin to retain the end of the shaft in the pilot pin. A cylindrical roller bearing having a casing 14 and bearings 15 is adapted to be placed in the space between the inner wall of the pilot pin housing and the shaft. Retaining ring 16 may be a split ring engaging the inner wall in the cavity of the pilot pin or it may be machined to a pressed fit with the wall. The latter is preferred.

To assemble this device, retaining ring 16 is placed on the shaft adjacent collar 4. The roller bearing is placed over the shaft next to ring 16. Split ring 13 is placed over the shaft until it comes to rest in groove 12. The pilot pin housing is then placed over the split ring 13 and over the bearing with a sliding fit, after which assembly as a last operation ring 16 is pressed into place in the pilot pin housing.

The device described and illustrated discloses the preferred form of the invention. The proportions are such that the bearings employed are roller bearings to withstand relatively large side thrusts. In small installations where space is a factor and the loads light, ballbearings may be employed.

It is to be understood that certain changes, alterations, modifications and substitutions can be made without departing from the spirit and scope of the appended claims.

We claim as our invention:

1. A cutting tool holder comprising a shaft, a pilot pin rotatably mounted thereon, said pilot pin having a hole formed in one end thereof into which the end of the shaft extends, substantially equal to the diameter of said shaft, said hole being larger than the diameter of the shaft for the greater part of its length to form an annular chamber between the shaft and the inner wall of the pilot pin, said shaft having a groove formed therein adjacent the end of said enlarged hole in said pilot pin, a split, expanding ring surrounding said shaft extending into said groove and adapted to engage the inner wall of said pilot pin to retain the end of said shaft in said hole, antifriction bearing means between said shaft and said pilot pin, and a retaining ring adapted to retain said bearing means by engaging the inner wall of said pilot pin.

2. A cutting tool holder comprising a shaft, a pilot pin rotatably mounted thereon, said pilot pin having a hole formed in one end thereof into which one end of said shaft extends, substantially equal to the diameter of the shaft, said pilot pin having a portion of the hole enlarged to a cylindrical opening formed coaxially with one end of said hole to provide a bearing chamber between said shaft and said pilot pin, anti-friction bearing means in said chamber, and means at one end of said enlarged portion of said hole interengaging said shaft and said pilot pin to retain said shaft in said hole and to prevent relative axial movement but permit free relative rotational movement therebetween.

JACOB R. NEWCOMER, Jr.
CARROLL E. ADREON.